United States Patent
De Mello et al.

(10) Patent No.: US 12,000,218 B2
(45) Date of Patent: Jun. 4, 2024

(54) ADAPTER TOOL FOR COUPLING A BEND STIFFENER WITH INTERFACE FOR BELL MOUTHS OF MODELS WITH BSN900E TYPE CONNECTION IN A DIVERLESS BELL MOUTH (BSDL) AND INTERCONNECTION METHODS

(71) Applicant: PETRÓLEO BRASILEIRO S.A.—PETROBRÁS, Rio de Janeiro (BR)

(72) Inventors: Flavio Barroso De Mello, Rio de Janeiro (BR); Bruno Pinho Dos Reis, Rio de Janeiro (BR); Vinicius Gasparetto, Rio de Janeiro (BR)

(73) Assignee: PETRÓLEO BRASILEIRO S.A.—PETROBRÁS, Rio de Janeiro (BR)

( * ) Notice: Subject to any disclaimer, the term of this patent is extended or adjusted under 35 U.S.C. 154(b) by 75 days.

(21) Appl. No.: 17/549,173

(22) Filed: Dec. 13, 2021

(65) Prior Publication Data

US 2022/0186570 A1 Jun. 16, 2022

(30) Foreign Application Priority Data

Dec. 14, 2020 (BR) ...................... 10 2020 025523 1

(51) Int. Cl.
*E21B 17/01* (2006.01)
*E21B 19/00* (2006.01)
*E21B 33/038* (2006.01)
*E21B 43/01* (2006.01)
(Continued)

(52) U.S. Cl.
CPC ............ *E21B 19/004* (2013.01); *E21B 17/01* (2013.01); *E21B 43/0107* (2013.01); *F16L 37/098* (2013.01); *E21B 33/038* (2013.01); *H02G 1/10* (2013.01)

(58) Field of Classification Search
None
See application file for complete search history.

(56) References Cited

U.S. PATENT DOCUMENTS

| 6,220,303 | B1 * | 4/2001 | Secher | E21B 43/0135 138/109 |
| 7,387,469 | B2 * | 6/2008 | Duggan | E21B 17/017 405/211 |
| 9,482,061 | B2 * | 11/2016 | Latimer | E21B 17/085 |

(Continued)

*Primary Examiner* — Matthew Troutman
*Assistant Examiner* — Douglas S Wood
(74) *Attorney, Agent, or Firm* — BIRCH, STEWART, KOLASCH & BIRCH, LLP

(57) ABSTRACT

In order to achieve the objects described above, the present invention provides an adapter tool for coupling a ben stiffener with interface for bell mouths of models with connection type BSN900E in a diverless bell mouth (BSDL), consisting of a adapter split ring (1), guide pin holes (C), fastener eyes (D), and through holes (E). The adapter tool is capable of keeping interchangeability and flexibility between projects or project phases, even if different bellmouth models are used. The interconnection method between the helmet (9) and the adapter split ring (1) can be done by direct attachment by bolt, or by attachment by ring/rod support. Both interconnections can be made on board a flexible line launching vessel, in the case of reusing lines from other projects, or at the factory, in the case of sharing new flexible lines.

9 Claims, 5 Drawing Sheets

(51) Int. Cl.
*F16L 37/098* (2006.01)
*H02G 1/10* (2006.01)

(56) References Cited

U.S. PATENT DOCUMENTS

| | | | |
|---|---|---|---|
| 10,385,624 B2* | 8/2019 | Duggan | F16L 57/005 |
| 10,858,901 B1* | 12/2020 | Rahim | F16L 37/142 |
| 11,274,504 B2* | 3/2022 | Amorim | E21B 17/01 |
| 11,613,934 B2* | 3/2023 | Pinho Dos Reis | E21B 17/017 |
| | | | 166/367 |
| 2003/0017010 A1* | 1/2003 | Heyl | B63B 22/023 |
| | | | 114/230.1 |
| 2008/0007056 A1* | 1/2008 | Beesley | E21B 43/0107 |
| | | | 285/321 |

* cited by examiner

ADAPTER TOOL FOR COUPLING A BEND STIFFENER WITH INTERFACE FOR BELL MOUTHS OF MODELS WITH BSN900E TYPE CONNECTION IN A DIVERLESS BELL MOUTH (BSDL) AND INTERCONNECTION METHODS

FIELD OF INVENTION

The present invention is based on the development of a solution for the adaptation between types of bell mouths.

The invention is in the field of flexible conduct and umbilical risers activities with interface for bell mouths with connection of BSN900E type in UEPs that have bell mouths BSDL model.

DESCRIPTION OF PRIOR ART

Usually, flexible risers are interconnected to platforms by devices that decouple the duct traction from lateral movements caused by displacements of the floating unit, the first portion being supported in a region close to the platform deck (hang-off), and the lateral loads transferred to a connecting device located in a position close to the bottom of the platform hull, there being a sliding coupling between such device and the conduct. A typical example of this widely used connection device is the bell mouth, as disclosed in U.S. Pat No. 5,947,642A, The decoupling between the traction and lateral movements of flexible risers provides great operational benefits for conduct technology; such as, for example, the increase of its lifetime, not limited only to this one.

The bell mouth is a device responsible for locking the so-called bend stiffenerr (bend stiffener) of the flexible risers during pull-inoperations. The bend stiffener or bend restrictor protect the risers from stress of shear forces and bending moments, as they are normally locked in the supports. Basically, this device has the function of ensuring the maintenance of the riser's bending radius within a safe range, in addition to reducing the effect of fatigue in the connection region.

The reuse or sharing of flexible lines between projects is a frequent practice in projects in the oil industry. In order to facilitate the interchangeability of risers between production units, Petrobras has recently established a standardization for the supports of these risers. This standardization considers the use of bell mouths of the BSN900E type, since this is the most used model in the company's production units. However, the interface of this bellmouth model is not compatible with new developments aimed at reducing dive time. This difference in interfaces prevents the interchangeability of lines between the two types of support.

To allow for this, it is necessary to re-terminate the top end of the risers to change the stiffener's helmet, which requires the acquisition of new accessories and their respective assembly on the line, with an impact on project delivery.

At Petrobras, the device described by document U.S. Pat. No. 5,947,642A is widely used, where the most common models are the bell mouth BSN300, BSMF and BSN900E, the latter being defined as a standard interface for the interconnection of flexible risers to the UEP by Petrobras.

Recently, it was developed by Petrobras (BR102018011452A2) an alternative support called Diverless Bell Mouth (BSDL) which, in addition to the benefits presented above, eliminates the need for diver monitoring during pull-inoperations.

The use of BSDL has advantages over the BSN900E and BSMF models, such as the optimization of the riser connecting process during the pull-in operation and the drastic reduction of man-hours exposed to risk (HHER) in shallow diving activities. Despite some similarities between the types of supports, the connection interfaces of the bending stiffeners present geometric dissimilarities, making it impossible to couple a bending stiffener with interface for the bellmouth model BSN900E or BSMF in a bellmouth model BSDL.

Document US20080087435A1 discloses a subsea connector equipment that includes a guide funnel assembly, which can be coupled to a subsea structure and a rod that can be coupled to a bend limiter/restrictor, or to a bend stiffener. Despite using an adapter equipment that connects to the bending stiffener to help connecting to the riser, the document does not mention the possibility of using other types of support systems.

Document BR102018011452A2 discloses a coupling system between a bending stiffener and a bell mouth, comprising a plurality of locking mechanisms, in which each locking mechanism is fixed externally to the bell mouth. Despite presenting a method to effect coupling between a risers curvature stiffener in a bellmouth, the invention is not able to allow the interchangeability between two types of support.

GB2508919A discloses a subsea connector assembly for automatically coupling a mobile subsea structure to a fixed tubular subsea structure. Although the connectors assist in coupling the bending stiffener, the apparatus is not capable of allowing interchangeability between two types of support.

Given the limitations present in the State of the Art for adaptation solutions between different couplings, there is a need to develop a technology capable of providing an effective performance and that is in accordance with the standardization recommendations. The State of the Art mentioned above does not have the unique characteristics of this invention, which will be presented in detail below.

OBJECTS OF THE INVENTION

The present invention has as one of the objects to enable the coupling of a bending stiffener with interface for bellmouths of models with connection of the type BSN900E in a bellmouth model BSDL.

Another object of this invention is to allow interchangeability between the two support systems.

The object of this invention also comprises the methods of enabling the coupling of the bending stiffener with interface for bellmouths of models with connection type BSN900E in a bellmouth model BSDL.

BRIEF DESCRIPTION OF THE INVENTION

In order to achieve the objects described above, the present invention provides an adapter tool for coupling a bending stiffener with interface for bellmouths of models with connection of the type BSN900E in a diverless bellmouth (BSDL). The adapter tool allows interchangeability and flexibility between projects or project phases, even if different bellmouth models are used.

The adapter developed in this invention comprises a split ring to be installed next to the bend stiffener helmet to allow interchangeability between the support systems.

The type of-installation, also object of this invention, consists of two different assembly methods, one with fasteners directly linked to the helmet and the other with a support ring and rods.

BRIEF DESCRIPTION OF THE DRAWINGS

The present invention will be described in more detail below, with reference to the attached figures which, in a schematic and non-limiting way, represent examples of the achievement thereof. In the drawings, there are.

DETAILED DESCRIPTION OF THE INVENTION

The development of the adapter tool revealed here occurred due to the search for greater interchangeability and flexibility between projects or project phases, even if different bellmouth models are used.

Below follows the detailed description of a preferred embodiment of the present invention, of an exemplary nature and in no way limiting. Nevertheless, it will be clear to one skilled in the art, from reading this description, possible additional embodiments of the present invention further comprised by the essential and optional features below.

Figure 1:
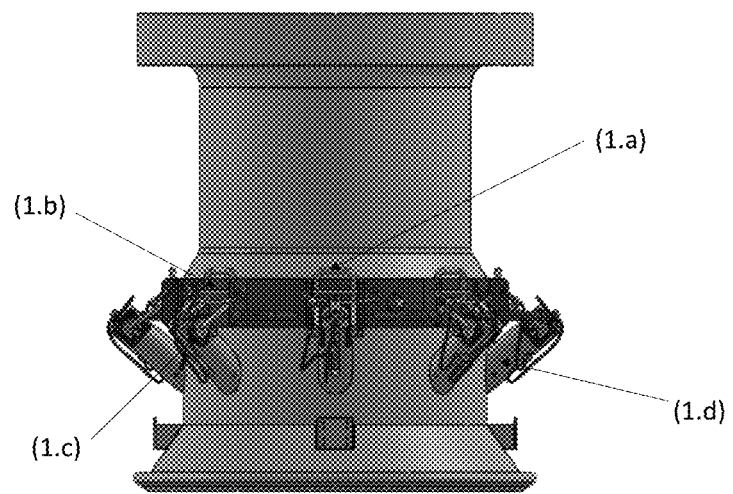
FIG. 1 illustrates the new BSDL-type support, being (1.*a*) handle, (1.*b*) clamp, (1.*c*) eccentric, (1.*d*) tongue holder.

The use of the Diverless Bell Mouth (BSDL) support, shown in FIG. 1, allows the optimization of the riser connection process during the pull-in operation and eliminates the need for diver monitoring, leading to a drastic reduction in exposed man-hours risk (HHER) in shallow diving activities. These are significant advantages over the BSN900E and BSMF models.

Figure 2:
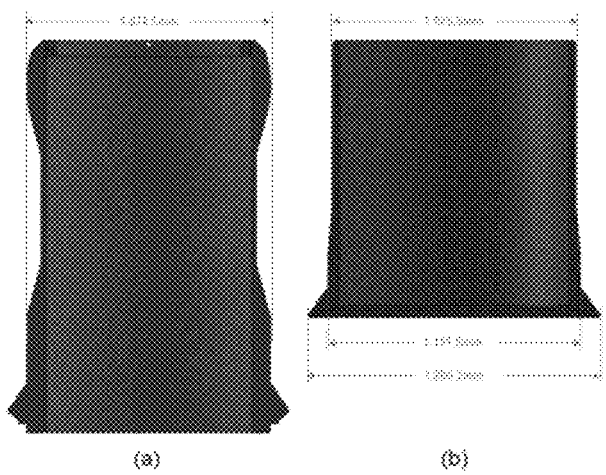
FIG. 2 illustrates the interfaces for coupling a bend stiffener, being (a) helmet model BSDL and (b) helmet model BSN900E.

BSN900E and BSMF supports have some similarities with BSDL support. However, the connection interfaces of the bending stiffeners, fixed inside these supports in a flexible conduct coupling system, present geometric incompatibilities, making it impossible, for example, to couple the bending stiffener with interface for the bell mouth model BSN900E or BSMF in a model BSDL bellmouth, as shown in FIG. 2 for model BSN900E.

Figure 4:
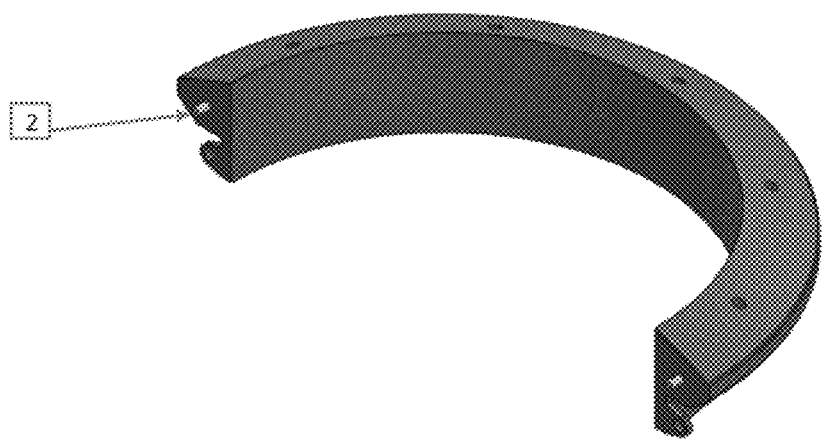
FIG. 4 illustrates the detail of the guide pins attached to the adapter split ring, where: (2) Guide pin.
Figure 5:
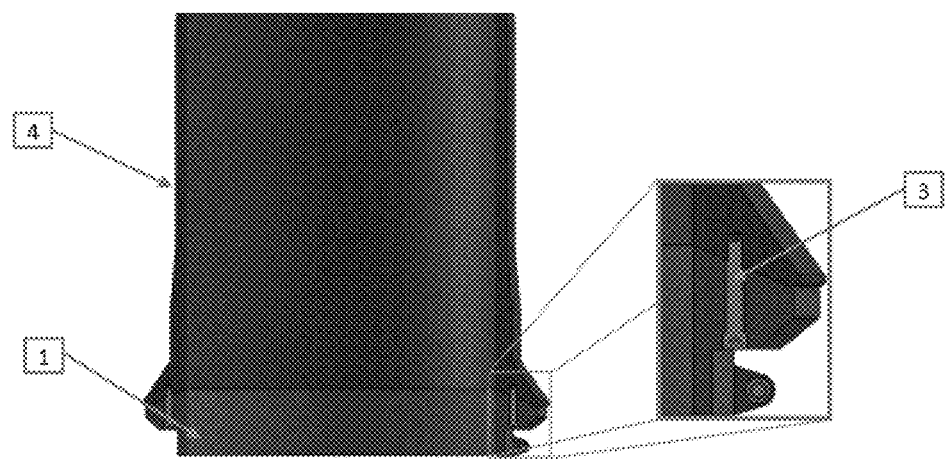
FIG. 5 illustrates the application of the adapter split ring in the BSDL type support system with direct bolt fixation method, where: (1) Adapter Split Ring, (3) Adapter Split Ring Fastener with Helmet, (4) Tongue.

This invention proposes an adapter equipment that allows the coupling of a bending stiffener with interface for bell-mouths of models with connection type BSN900E in a bellmouth model BSDL. In the proposed configuration, a split ring, shown in FIGS. 3 and 4, is installed next to the bend stiffener helmet to allow interchangeability between the support systems, as shown in FIG. 5 for the BSN900E model.

Figure 3:
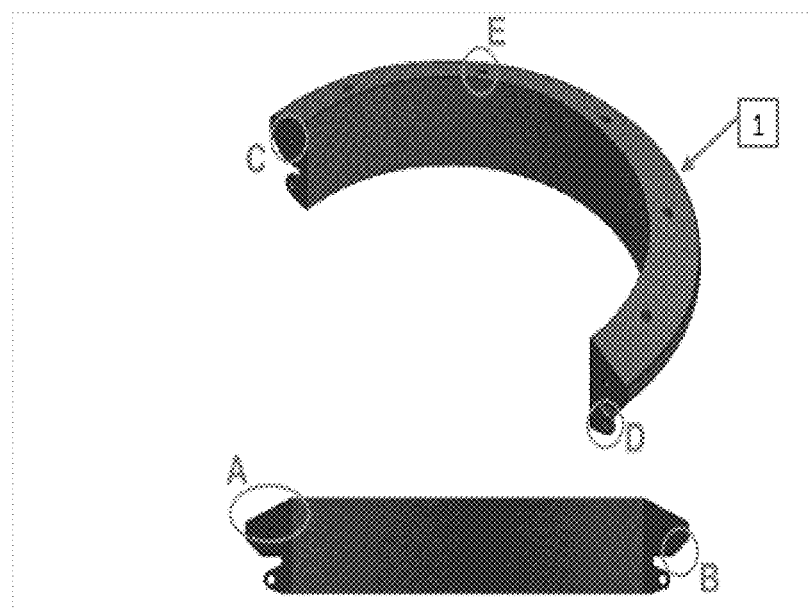
FIG. 3 illustrates the detail of the Split Adapter Ring (1), where: (A) upper part—geometry compatible with the dovetail profile of the helmet model BSN900E (B) lower part—geometry compatible with the helmet setting profile of the BSDL on the tongue, (C) holes for guide pins on diametrically opposite faces, (D) eyes for fasteners, which join the split ring, (E) through holes for use with bolts in the direct bolt fastening method.

The split adapter ring has, on the upper part, a geometry compatible with the dovetail profile of the helmet model BSN900E for fitting the helmet onto the ring (detail (A), FIG. 3). At the bottom, the split ring adapter has a geometry compatible with the BSDL helmet setting profile on the tongue (detail (B), FIG. 3). In addition, it has holes for guide pins (C) on the diametrically opposite faces. In this same location, there are eyes (D) for fasteners, which join the split ring. The ring also has through holes (E) for use with bolts in the direct bolt fastening system, as described in FIG. 3 for model BSN900E.

There are two forms of interconnection between the helmet (FIG. 2) and the split ring adapter, object of this invention (FIGS. 3 and 4), comprising direct attachment by bolts, or attachment by ring/rod of support.

Both interconnections can be made on board a flexible line launching vessel, in the case of reusing lines from other projects, or at the factory, in the case of sharing new flexible lines.

In direct bolt attachment, the adapter split ring (1) can be attached to the bellmouth adapter helmet through the through holes (E), as shown in FIG. 5 for model BSN900E. In the case of sharing new lines between projects, attachment could be done at the factory. In the case of reusing previously manufactured lines, this fastening system depends on the ability to machine the holes on board a flexible conduct installation vessel. If this is not possible, the ring/rod support attachment method must be used.

Figure 6:
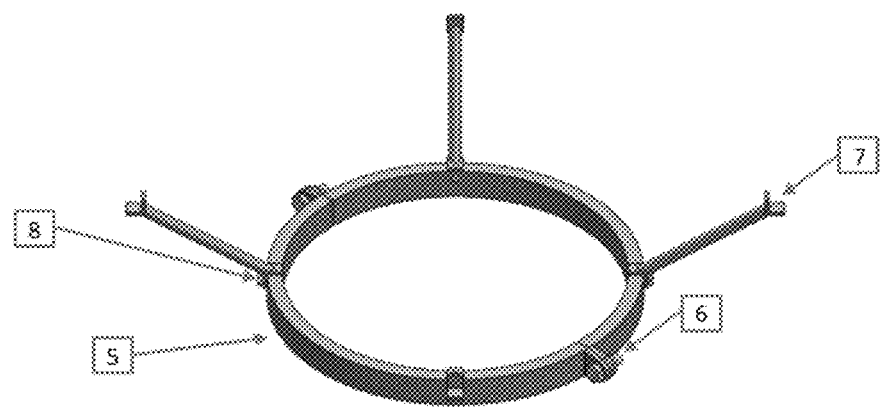
FIG. 6 illustrates the ring/rod support system, where: (5) Support Back-up Ring, (6) Fastener of Support Back-up Ring; (7) Support Rod, (8) Fastener of Support Rod.
Figure 7:
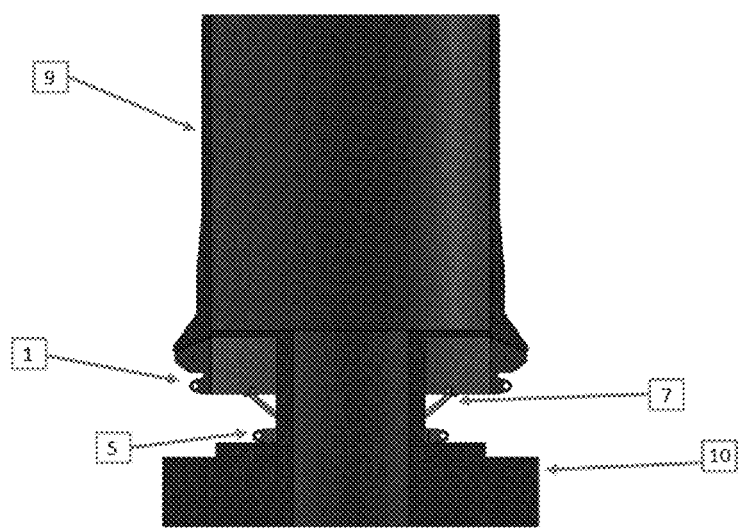
FIG. 7 illustrates the assembly of the first half of the adapter split ring on the stiffener plus helmet assembly, for the BSN900E model, where: (1) Adapter Split Ring, (5) Support Back-up Ring, (7) Support Rod, (9) Helmet, (10) Bend Stiffener.

When fixing by ring/rod support, the split ring adapter can be attached to the helmet by installing a ring/rod support system. This system consists of a split support ring (5) and support rods (7) that are attached to the support ring (5) with boltas (6 and 8), as shown in FIG. 6. First, the guide pins are mounted into one of the halves of the split ring adapter (1). Then, the adapter split ring (1) is positioned below the helmet (9), along with the support ring (5) and rods (7), as shown in FIG. 7.

Figure 8:
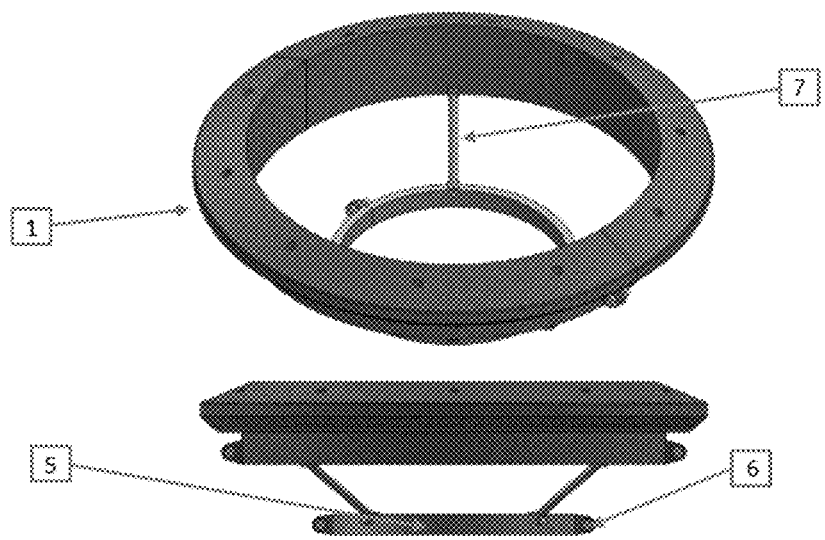
FIG. 8 illustrates the adapter split ring assembly and the ring/rod support system, where: (1) Adapter Split Ring, (5) Support Back-up Ring, (6) Fastener of Support Back-up Ring; (7) Support Rod.

FIG. 8 shows a view of the adapter split ring (1) supported by the support rods (7), without the stiffener plus helmet assembly.

Figure 9:
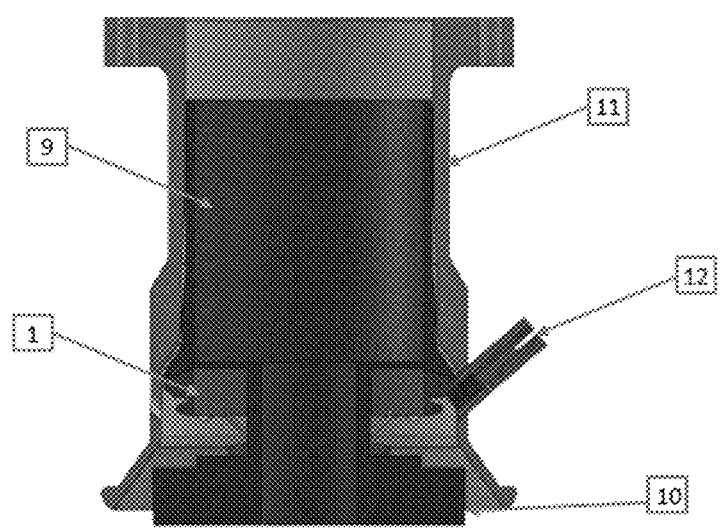
FIG. 9 illustrates the application of the split ring adapter in the BSDL-type support system with ring/rod fastening method, where: (1) Split Ring Adapter, (9) Helmet, (10) Bend Stiffener, (11) Central Structure od BSDL, (12) Tongue Holder.

FIG. 9 shows a cross-sectional view of the application of the adapter split ring (1) in the BSDL type support system with ring/rod attachment method.

The invention claimed is:
1. Adapter tool for coupling a bend stiffener with interface for bell mouths of models having a first type of connection in a bell mouth having a second type of connection, the second type of connection being different from the first type of connection, the adapter tool comprising an adapter split ring (1) having an upper part geometry compatible with a dovetail profile of a helmet on a bell mouth having the first type of connection and a lower part geometry, compatible with a helmet setting profile on a tongue of the bell mouth having the second type of connection, wherein the adapter split ring includes holes for guide pins (C), eyes (D) for fasteners, and through holes (E), and wherein the upper part geometry of the adapter split ring (1) enables the dovetail profile of the helmet to fit onto the adapter split ring (1).

2. The adapter tool according to claim 1, the holes for guide pins (C) are positioned on diametrically opposite faces of the split ring.

3. The adapter tool according to claim 1, wherein the eyes (D) for fasteners are configured to accept eyebolts for joining the split ring.

4. The adapter tool according to claim 1, wherein the through holes (E) are configured to accept bolts to connect the split ring with the helmet of the bell mouth having the first connection type by direct bolt attachment.

5. The adapter tool according to claim 1, wherein that the adapter split ring (1) is installed in the helmet (9) of the bell mouth having the first connection type through direct bolt attachment.

6. The adapter tool according to claim 1, wherein the adapter split ring (1) being installed in the helmet (9) of the bell mouth having the first connection type through attachment by ring/rod support.

7. The adapter tool according to claim 6, wherein the ring/rod support includes a support split ring (5) and support rods (7) attached to the support split, ling (5) with bolts (6 and 8).

8. Method of interconnection between the helmet and the adapter split ring, using direct attachment by bolts, of an adapter tool defined in claim 1, the method comprising the following steps:
   a) Mounting guide pins (2) on one of the adapter split ring halves (1);
   b) Positioning the adapter split ring (I) below the helmet (9);
   c) Attaching the adapter split ring (I) with fasteners through the through holes (E);
   d) Positioning a second half of the adapter spit ring (1) below the helmet (9), performing a fit in a first half through the guide pins (2);
   d) Attaching the second half of the adapter split ring (1) with fasteners through the through holes (E); and
   f) Locking the adapter split ring (l) using fasteners through the eyes (D).

9. Method of interconnection between a helmet and an adapter split ring, using direct attachment by ring/rod support, of an adapter tool defined in claim 1, the method comprising the following steps:
   a) Mounting guide pins (2) on one of the adapter split ring halves (1);
   b) Mounting rods (7) on both halves of a support ring (5);
   c) Positioning a first half of the adapter split ring (1) below the helmet (9), together with the support ring (5) and the rods (7);
   d) Positioning a second half of the adapter split ring (1) below the helmet (9), performing a fit in the first half of the adapter split ring through the guide pins (2), together with the support ring (50) and the rods (7);
   d) Locking the adapter split ring (1) using fasteners through the eyes (D); and
   f) Locking the support ring (1) using fasteners (6 and 8).

* * * * *